United States Patent
Kim et al.

(10) Patent No.: US 9,109,055 B2
(45) Date of Patent: Aug. 18, 2015

(54) TRANSITION METAL CATALYST COMPOSITION INCLUDING A TRANSITION METAL COMPOUND AND A METHOD OF PREPARING A POLYOLEFIN USING THE CATALYST COMPOSITION

(75) Inventors: Won-Hee Kim, Daejeon (KR); Kyung-Seop Noh, Daejeon (KR); Nan-Young Lee, Seoul (KR); Sang-Jin Jeon, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

(21) Appl. No.: 14/112,849

(22) PCT Filed: Aug. 24, 2012

(86) PCT No.: PCT/KR2012/006787
§ 371 (c)(1),
(2), (4) Date: Oct. 18, 2013

(87) PCT Pub. No.: WO2014/021494
PCT Pub. Date: Feb. 6, 2014

(65) Prior Publication Data
US 2014/0309387 A1    Oct. 16, 2014

(30) Foreign Application Priority Data
Aug. 3, 2012  (KR) .......... 10-2012-0085343

(51) Int. Cl.
*C08F 4/64* (2006.01)
*C08F 4/76* (2006.01)
*B01J 23/00* (2006.01)
*B01J 21/06* (2006.01)
*C08F 10/00* (2006.01)

(52) U.S. Cl.
CPC . *C08F 4/76* (2013.01); *B01J 21/06* (2013.01); *C08F 4/64* (2013.01); *C08F 10/00* (2013.01)

(58) Field of Classification Search
CPC ....... C08F 4/64; C08F 4/69353; C08F 4/6937
USPC .................................................. 526/172, 161
See application file for complete search history.

(56) References Cited

U.S. PATENT DOCUMENTS

| | | |
|---|---|---|
| 2003/0018141 A1 | 1/2003 | Wass |
| 2004/0043893 A1 | 3/2004 | Laughlin |
| 2007/0043176 A1 | 2/2007 | Martin et al. |
| 2007/0287814 A1 | 12/2007 | Jensen et al. |

FOREIGN PATENT DOCUMENTS

| | | | |
|---|---|---|---|
| CN | 1105674 A | 7/1995 | |
| CN | 1286271 A | 3/2001 | |
| CN | 101616922 A | 12/2009 | |
| CN | 102245620 A | 11/2011 | |
| JP | 2008-530298 A | 8/2008 | |
| JP | 2011-127121 A | 6/2011 | |
| KR | 1019990088089 A | 12/1999 | |
| KR | 20060091528 A | 8/2006 | |
| KR | 20110009943 A | 1/2011 | |
| KR | 1020110071245 A | 6/2011 | |
| KR | 10-2011-0090749 A | 8/2011 | |
| KR | 20120090479 A | * 8/2012 | ............... B01J 31/22 |

OTHER PUBLICATIONS

Peters et al. Inorg. Chem. 2001, 40, 5083-5091.*
Harkins et al. Inorg. Chem. 2006, 45, 4316-4318.*
Huang et al. Organometallics 2004, 23, 2813-2816.*
Karl Seyfrth, et al.:"Formation and Structure of the Catalytically Active Complex in Olefin Metathesis Catalysts Based on Nitrosylmolybdenum Compounds", 5. Journal of Molecular Catalysis, 28 (1985) 53-69.
Justyna M. Zurek, et al.:"Photoisomerization in a Platinum-Amido Pincer Comlex: An Excited-State Reaction Pathway Controlled by Localized Ligand Photochemistry", Journal of Physical Chemistry Letters, 2010, 1301-1306.

* cited by examiner

*Primary Examiner* — Rip A Lee
(74) *Attorney, Agent, or Firm* — Dentons US LLP

(57) ABSTRACT

The present invention relates to a transition metal catalyst composition which can exhibit high reactivity in a polymerization reaction of a polyolefin and can easily control characteristics such as chemical structure, molecular weight distribution, mechanical properties, and the like of a synthesized polyolefin, and a method of preparing a polyolefin using the catalyst composition.

10 Claims, No Drawings

TRANSITION METAL CATALYST COMPOSITION INCLUDING A TRANSITION METAL COMPOUND AND A METHOD OF PREPARING A POLYOLEFIN USING THE CATALYST COMPOSITION

This application is a national stage application of International Application No. PCT/KR2012/006787, filed on Aug. 24, 2012, which claims priority to and the benefit of Korean Patent Application No. 10-2012-0085343, filed in the Korean Intellectual Property Office on Aug. 3, 2012, the entire contents of which are incorporated herein by reference.

FIELD OF THE INVENTION

The present invention relates to a metallocene catalyst composition including a transition metal compound and a method of preparing a polyolefin using the catalyst composition, and specifically relates to a transition metal catalyst composition which can exhibit high reactivity in a polymerization reaction of a polyolefin and can easily control characteristics such as chemical structure, molecular weight distribution, mechanical properties, and the like of a synthesized polyolefin, and a method of preparing a polyolefin using the catalyst composition.

BACKGROUND OF THE INVENTION

A Ziegler-Natta catalyst of a titanium or vanadium compound has been used widely in commercial processes for manufacturing polyolefins. The Ziegler-Natta catalyst has high activity but it is a multi-active site catalyst. Therefore, the molecular weight distribution of a polymer prepared by using the same is wide and the distribution of co-monomers is uneven, and there is a limitation in securing desirable properties.

Accordingly, a metallocene catalyst with which a transition metal such as titanium, zirconium, hafnium, and the like and a ligand including a cyclopentadiene functional group are coupled was developed, and has recently been widely used.

Such a metallocene catalyst is a mono-active site catalyst having one kind of active site, and it has an advantage in that a polymer prepared by using the same has a narrow molecular weight distribution, and it is possible to control the molecular weight, the stereoregularity, and the crystallinity, and particularly to drastically control the reactivity of comonomers according to the structure of the catalyst and ligand.

However, a polyolefin polymerized by a metallocene catalyst has a narrow molecular distribution, and there has been a problem in that it is difficult to apply the same to manufacturing because productivity becomes remarkably worse as a result of the influence of an extrusion load when it is applied to some products. Therefore, there have been various attempts to resolve the problem.

$[Me_2Si(Me_4C_5)NtBu]TiCl_2$ (a constrained-geometry catalyst, CGC) developed by DOW Co. in the early 1990's is superior to prior metallocene catalysts known in the copolymerization reaction of ethylene and an α-olefin in that (1) it exhibits high activity at a high polymerization temperature and prepares a polymer with a high molecular weight, and (2) it can easily carry out the synthesis of an α-olefin such as 1-hexene and 1-octene having large steric hindrance. As such various characteristics of CGC are becoming known, various studies for synthesizing derivatives thereof and using the same as a polymerization catalyst have been actively progressing.

For example, attempts have been made to synthesize a metal compound to which various bridges and nitrogen substituents are introduced instead of a silicone bridge, and polyolefins by using the same.

Representative metal compounds known to date are as follows.

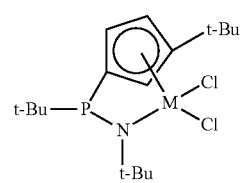

1

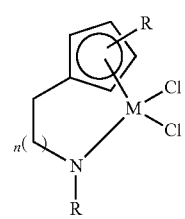

2

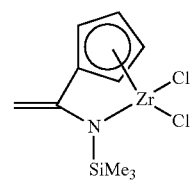

3

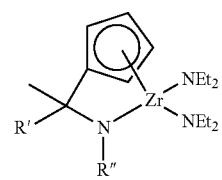

4

Phosphorous (1), ethylene or propylene (2), methylidene (3), and methylene (4) bridges have been introduced into the listed compounds instead of a silicone bridge of a CGC structure, but they do not give remarkable results in the aspects of activity or copolymerization performance in comparison with a CGC when they are applied to polymerization of ethylene or copolymerization with α-olefins.

Furthermore, many compounds composed of an oxido-ligand instead of the amido-ligand of the CGC have been synthesized, and syntheses of polyolefins using them have been partially attempted.

Examples of this are as follows.

5

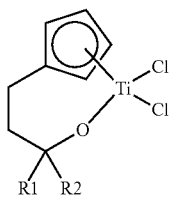

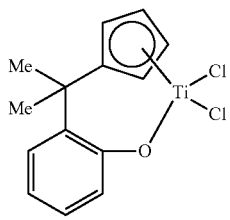

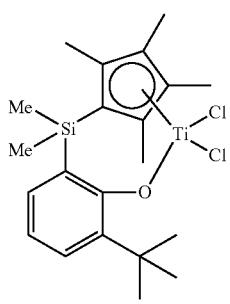

Furthermore, synthesis of a catalyst (8) having a similar structure to the above compounds and a high temperature and high pressure polymerization method using the same have been presented by Sumitomo Co.

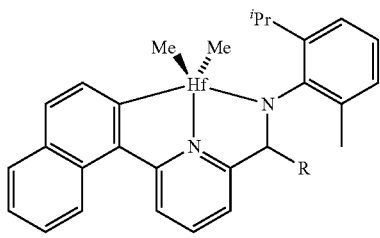

Meanwhile, Mitsui Co. of Japan developed a group 4 transition metal compound (Ti, Zr) based on a phenoxy imine, and synthesized polyethylene and polypropylene having various characteristics.

It is a specific feature of the catalyst that it does not include a cyclopentadiene ligand which is an important skeleton of prior metallocene catalysts or CGCs in its structure.

Therefore, such catalyst has emerged as a popular post-metallocene catalyst, namely a next generation catalyst breaking away from the metallocene structure.

Since then, this catalyst was named an FI catalyst (10) and has been investigated in detail regarding the catalytic activity and the efficiency according to various substituents changed around the basic skeleton of the catalyst.

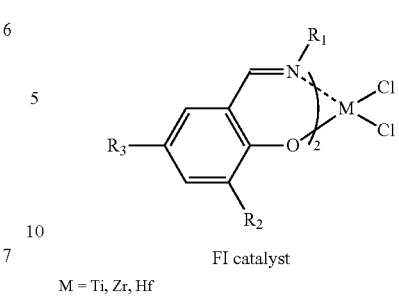

FI catalyst
M = Ti, Zr, Hf

Recently, the catalysts (11, 12) having a ligand including another bridge, namely a phenyl group, in a CGC backbone were presented by LG Chem. Ltd. (Organometallics, 2006, 25, 5122 and 2008, 27, 3907).

These catalysts are characterized in that they show activity, content of 1-octene, and molecular distribution which are same as or higher than existing CGCs when they are used to synthesize an ethylene/1-octene copolymer.

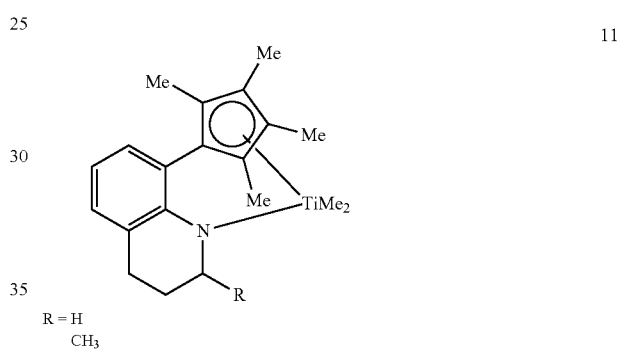

R = H
CH$_3$

R = CH$_2$CH$_3$
CH$_3$

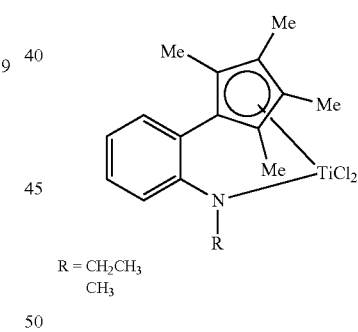

However, post-metallocene catalysts applicable to commercial processes in practice are not largely known, and thus, there is still a need to study post-metallocene catalysts which can exhibit higher polymerization performance and can provide polyolefins having excellent properties.

DETAILED DESCRIPTION OF THE INVENTION

Technical Objectives

It is an aspect of the present invention to provide a transition metal catalyst composition which can exhibit high reactivity in a polymerization reaction of a polyolefin and can easily control characteristics such as chemical structure, molecular weight distribution, mechanical properties, and the like of a synthesized polyolefin.

It is another aspect of the present invention to provide a method of preparing a polyolefin using the catalyst composition.

Technical Solutions

The present invention provides a transition metal catalyst composition including a specific transition metal compound.

Further, the present invention provides a method of preparing a polyolefin using the catalyst composition.

Hereinafter, the transition metal catalyst composition and the method of preparing a polyolefin according to concrete embodiments are explained in more detail.

According to one embodiment of the present invention, a transition metal catalyst composition including a transition metal compound of the following Chemical Formula 1, a co-catalyst, and an organic solvent is provided.

As the result of experiments, the present inventors recognized that characteristics such as chemical structure, molecular weight distribution, mechanical properties, and the like of a synthesized polyolefin can be easily controlled and high reaction efficiency can be realized because of the electrical and stereoscopic structure of the novel transition metal compound of Chemical Formula 1, and accomplished the present invention.

[Chemical Formula 1]

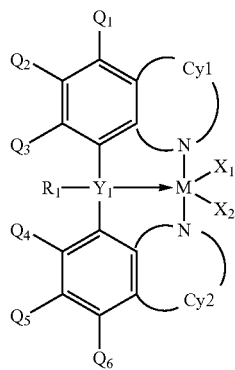

In Chemical Formula 1, $R_1$ may be a $C_1$-$C_{10}$ alkyl unsubstituted or substituted with a halogen group, a $C_5$-$C_{60}$ cycloalkyl unsubstituted or substituted with a halogen group, a $C_6$-$C_{60}$ aryl unsubstituted or substituted with a halogen group, a $C_5$-$C_{60}$ cycloalkenyl unsubstituted or substituted with a halogen group, a $C_2$-$C_{20}$ alkenyl unsubstituted or substituted with a halogen group, a $C_7$-$C_{60}$ alkylaryl unsubstituted or substituted with a halogen group, or a $C_7$-$C_{60}$ arylalkyl unsubstituted or substituted with a halogen group.

$Q_1$, $Q_2$, $Q_3$, $Q_4$, $Q_5$, and $Q_6$ may be the same as or different from each other, and may independently be hydrogen, deuterium, a halogen group, a nitrile group, an acetylene group, an amine group, an amide group, a $C_1$-$C_{20}$ alkoxy carbonyl group, a $C_1$-$C_{20}$ alkanoyl group, a silyl group, a $C_1$-$C_{20}$ alkyl group, a $C_2$-$C_{20}$ alkenyl group, a $C_6$-$C_{20}$ aryl group, a $C_4$-$C_{20}$ heteroring group, a $C_1$-$C_{20}$ alkoxy group, or a $C_6$-$C_{20}$ aryloxy group, and 2 or more of $Q_1$, $Q_2$, $Q_3$, $Q_4$, $Q_5$, and $Q_6$ may be connected to each other so as to form an aliphatic ring or an aromatic ring.

Furthermore, Cy1 and Cy2 may be the same as or different from each other, and may independently be a $C_4$-$C_{10}$ aliphatic ring which includes a nitrogen atom and is unsubstituted or substituted with one or more functional groups selected from the group consisting of hydrogen, a halogen, a $C_1$-$C_{20}$ alkyl group, and a $C_6$-$C_{20}$ aryl group. If there are two or more functional groups substituted in the aliphatic ring, they may be connected to each other so as to form an aliphatic ring or an aromatic ring.

Furthermore, M is a group 3 to 12 transition metal, and may preferably be titanium (Ti), zirconium (Zr), or hafnium (Hf).

$Y_1$ is oxygen (O), nitrogen (N), sulfur (S), or phosphorus (P).

M and $Y_1$ may form a coordinate bond, and "→" means a coordinate bond.

Furthermore, $X_1$ and $X_2$ may be the same as or different from each other, and may independently be a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, a $C_7$-$C_{20}$ arylalkyl group, a $C_1$-$C_{20}$ alkylamido group, a $C_6$-$C_{20}$ arylamido group, or a $C_1$-$C_{20}$ alkylidene group.

The present inventors synthesized a new transition metal compound including new organic ligands, and it was recognized through experiments that the electric and stereoscopic circumstances around the transition metal can be easily controlled by regulating the substituents introduced into the organic ligand compound, and a transition metal catalyst which can exhibit high reactivity in a polymerization reaction of a polyolefin and can easily control characteristics of such as chemical structure, molecular weight distribution, mechanical properties, and the like of a synthesized polyolefin can be provided.

Particularly, the transition metal compound of Chemical Formula 1 can have higher activity at a high temperature than prior metallocene catalysts or post-metallocene catalysts (catalysts not including a cyclopentadienenyl ligand) because its interatomic bonding and intermolecular bonding are relatively strong.

Each substituent of Chemical Formula 1 is explained in more detail as follows.

The $C_1$-$C_{20}$ alkyl group may include a linear or branched alkyl group, and the $C_2$-$C_{20}$ alkenyl group may include a linear or branched alkenyl group.

The silyl group may include a silyl functional group to which a $C_1$-$C_{20}$ alkyl group, a $C_6$-$C_{20}$ aryl group, a $C_1$-$C_{10}$ alkoxy group, or a $C_1$-$C_{20}$ alkylsilyl group is introduced, and for example, it may be trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, and the like, but it is not limited to or by them.

The aryl group is preferably a $C_6$-$C_{20}$ aromatic ring, and it may be phenyl, naphthyl, anthracenyl, pyridyl, dimethylanilinyl, anisolyl, and the like, but it is not limited to or by them.

The alkylaryl group means an aryl group to which one or more $C_1$-$C_{20}$ linear or branched alkyl groups are introduced, and the arylalkyl means a linear or branched alkyl to which one or more $C_6$-$C_{20}$ aryl groups are introduced.

The alkylamido group means an amido group to which one or more $C_1$-$C_{20}$ linear or branched alkyl groups are introduced, and specifically it may be a dimethylamido group, a diethylamido group, and the like, but it is not limited to or by them.

The arylamido group means an amido group to which one or more $C_6$-$C_{20}$ aryl groups are introduced, and concretely it may be diphenylamido group, and the like, but it is not limited to or by them.

The aryloxy group means an aryl functional group to which an oxygen atom is introduced, namely, a functional group represented by "—O—Ar".

The halogen group means fluorine (F), chlorine (Cl), bromine (Br), iodine (I), or astatine (At).

The nitrile group may be represented by "—C≡N", and the acetylene group may be represented by "—C≡CH".

Further, the amide group may be represented by

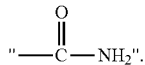

Meanwhile, a preferable example of the transition metal compound of Chemical Formula 1 may be a compound of the following Chemical Formula 2.

[Chemical Formula 2]

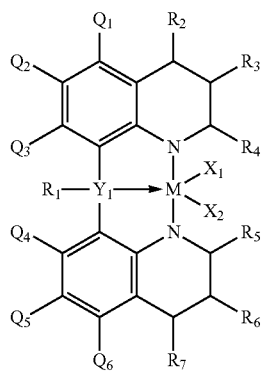

In Chemical Formula 2, $R_1$, $Q_1$, $Q_2$, $Q_3$, $Q_4$, $Q_5$, $Q_6$, M, $Y_1$, $X_1$, and $X_2$ are the same as in Chemical Formula 1.

In Chemical Formula 2, $R_2$, $R_3$, $R_4$, $R_5$, $R_6$, and $R_7$ may be the same as or different from each other, and may independently be hydrogen, a $C_1$-$C_{10}$ alkyl group, a $C_2$-$C_{20}$ alkenyl group, a $C_6$-$C_{20}$ aryl group, a $C_7$-$C_{20}$ alkylaryl, or a $C_7$-$C_{20}$ arylalkyl, a $C_1$-$C_{20}$ alkoxy group, or a $C_6$-$C_{20}$ aryloxy group.

A more preferable example of the compound of Chemical Formula 1 may be the compound of the following Chemical Formula 3.

[Chemical Formula 3]

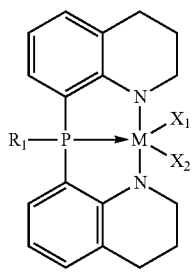

In Chemical Formula 3, $R_1$ may be a phenyl group, a cyclohexyl group, a methyl, an ethyl, an n-propyl, an iso-propyl, an n-butyl, an iso-butyl, or a tert-butyl, and $X_1$ and $X_2$ may be the same as or different from each other, and may independently be a halogen, a phenyl, a $C_7$-$C_{10}$ alkylaryl, a cyclohexyl group, a methyl, an ethyl, an n-propyl, an iso-propyl, an n-butyl, an iso-butyl, or a tert-butyl.

Specific examples of the compound of Chemical Formula 3 may be the compounds of the following Chemical Formulae 31 to 36, but the compound is not limited to or by them.

[Chemical Formula 31]

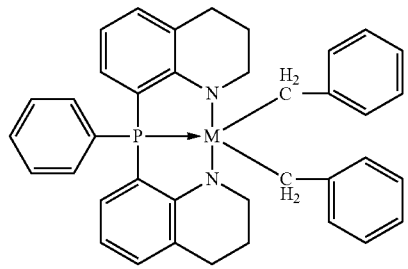

[Chemical Formula 32]

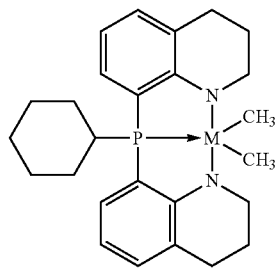

[Chemical Formula 33]

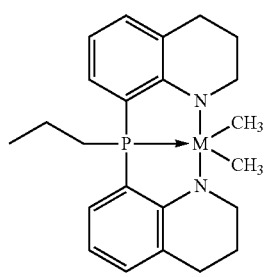

[Chemical Formula 34]

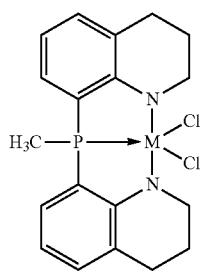

[Chemical Formula 35]

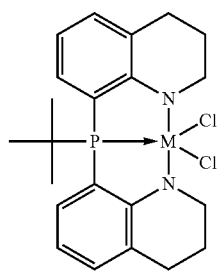

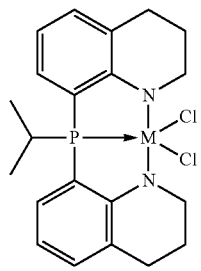

[Chemical Formula 36]

Meanwhile, the transition metal compound of Chemical Formula 1, 2, or 3 can be obtained by adding an alkyl lithium to the organic ligand compound of the following Chemical Formula 5 and then adding a salt of a transition metal thereto.

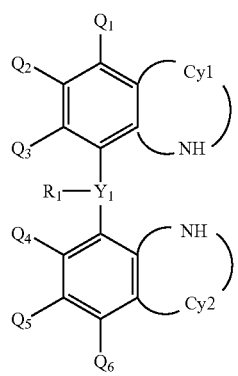

[Chemical Formula 5]

In Chemical Formula 5, $R_1$, $Q_1$, $Q_2$, $Q_3$, $Q_4$, $Q_5$, $Q_6$, $Y_1$, Cy1, and Cy2 are the same as in Chemical Formula 1.

Meanwhile, a preferable example of the organic ligand compound of Chemical Formula 5 may be the compound of the following Chemical Formula 6.

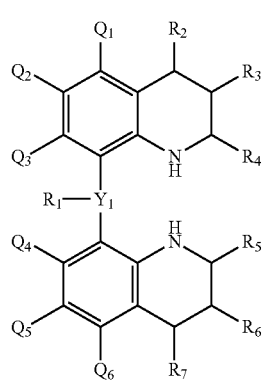

[Chemical Formula 6]

In Chemical Formula 6, $R_1$, $Q_1$, $Q_2$, $Q_3$, $Q_4$, $Q_5$, $Q_6$, and $Y_1$ are the same as in Chemical Formula 1, and $R_2$, $R_3$, $R_4$, $R_5$, $R_6$, and $R_7$ are the same as in Chemical Formula 2.

The details about Chemical Formula 5 or 6 are the same as in Chemical Formula 1 or 2.

Meanwhile, a more preferable example of the organic ligand compound of Chemical Formula 5 may be a compound of the following Chemical Formula 7.

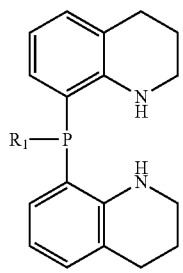

[Chemical Formula 7]

In Chemical Formula 7, $R_1$ may be a phenyl group, a cyclohexyl group, a methyl, an ethyl, an n-propyl, an iso-propyl, an n-butyl, an iso-butyl, or a tert-butyl.

Specific examples of the compound of Chemical Formula 7 may be compounds of the following Chemical Formulae 71 to 76, but the compound is not limited to or by them.

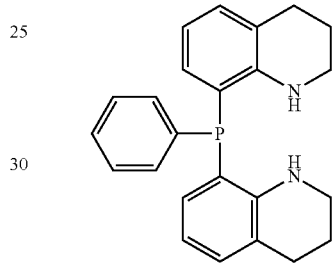

[Chemical Formula 71]

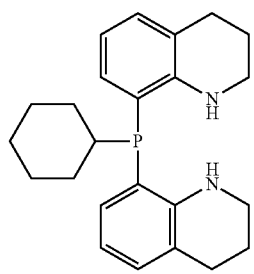

[Chemical Formula 72]

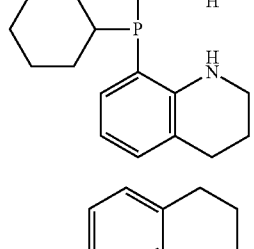

[Chemical Formula 73]

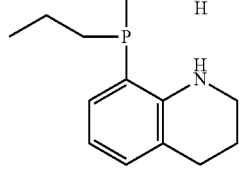

[Chemical Formula 74]

-continued

[Chemical Formula 75]

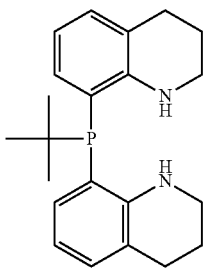

[Chemical Formula 76]

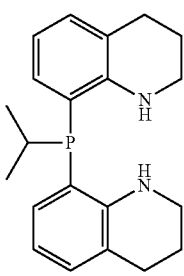

The organic ligand compound of Chemical Formula 5 can be obtained by the steps of reacting the compound of the following Chemical Formula 51 with an alkyl lithium and then reacting the same with carbon dioxide and an alkyl lithium, and reacting the product of said steps with the compound of the following Chemical Formula 52.

[Chemical Formula 51]

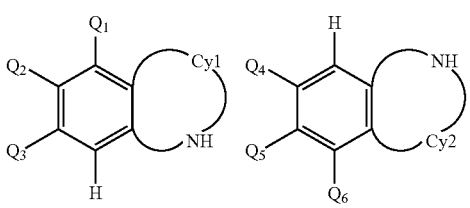

In Chemical Formula 51, $Q_1$, $Q_2$, $Q_3$, $Q_4$, $Q_5$, $Q_6$, Cy1, and Cy2 are the same as in Chemical Formula 1.

[Chemical Formula 52]

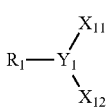

In Chemical Formula 52, $R_1$ and $Y_1$ are the same as in Chemical Formula 1.

Further, $X_{11}$ and $X_{12}$ may be the same as or different from each other, and each of them may be a halogen, and preferably chlorine (Cl) or bromine (Br).

Meanwhile, the transition metal compound of Chemical Formula 1 can be obtained by reacting the compound of the following Chemical Formula 53 with the organic ligand compound of Chemical Formula 5.

[Chemical Formula 53]

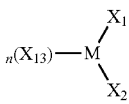

In Chemical Formula 53, M, $X_1$, and $X_2$ are the same as in Chemical Formula 1.

Further, $X_{13}$ may be the same as or different from said $X_1$ and $X_2$ and it may be a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, a $C_7$-$C_{20}$ arylalkyl group, a $C_1$-$C_{20}$ alkylamido group, a $C_6$-$C_{20}$ arylamido group, or a $C_1$-$C_{20}$ alkylidene group.

The following Reaction Scheme 1 represents one example of the preparation method of the transition metal compound of Chemical Formula 1 and the organic ligand compound of Chemical Formula 5.

However, the preparation method is not limited to or by the following Reaction Scheme 1.

[Reaction Scheme 1]

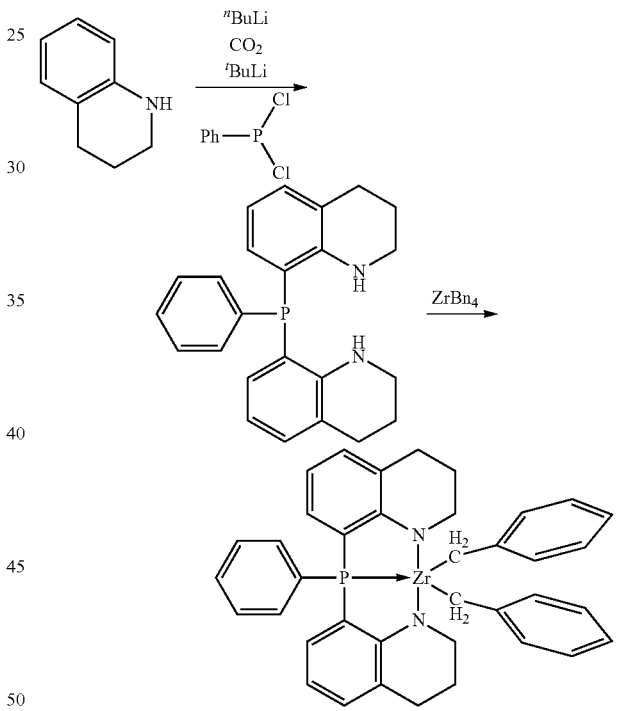

Meanwhile, the transition metal catalyst composition may include a co-catalyst.

Specific examples of the co-catalyst may be compounds of Chemical Formulae 11 to 13 and a mixture of 2 or more of them.

[L-H]+[Z(E)$_4$]$^-$ or [L]$^+$[Z(E)$_4$]$^-$      [Chemical Formula 11]

In Chemical Formula 11, L is a neutral or cationic Lewis base, [L-H]+ or [L]$^+$ is a Bronsted acid, H is a hydrogen atom, Z is a group 13 element (preferably boron or aluminum of a +3 acidic state), and each E may be the same as or different from each other and may independently be an unsubstituted $C_6$-$C_{20}$ aryl or $C_1$-$C_{20}$ alkyl group or a $C_6$-$C_{20}$ aryl or $C_1$-$C_{20}$ alkyl group with one or more hydrogen atoms substituted by a halogen, a $C_1$-$C_{20}$ hydrocarbyl, an alkoxy group, or a phenyl group.

Said hydrocarbyl is a monovalent functional group of a hydrocarbon from which a hydrogen atom is eliminated, and it may include an ethyl, a phenyl, and the like.

[Chemical Formula 12]

In Chemical Formula 12, D is aluminum or boron, and each $R_9$ may be the same as or different from each other and may independently be a halogen, a $C_1$-$C_{20}$ hydrocarbyl group, or a $C_1$-$C_{20}$ hydrocarbyl group substituted with a halogen.

[Chemical Formula 13]

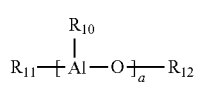

In Chemical Formula 13, $R_{10}$, $R_{11}$, and $R_{12}$ may be the same as or different from each other, and may independently be hydrogen, a halogen, a $C_1$-$C_{20}$ aliphatic hydrocarbyl, or a $C_1$-$C_{20}$ aliphatic hydrocarbyl substituted with a halogen, and a is an integer of 2 or more.

The compound of Chemical Formula 11 can takes a role of activating the transition metal compound, and may include a non-coordinate bonding anion which is compatible with a cation, i.e., a Bronsted acid.

It is preferable that the anion is relatively large and includes a single coordinate bonding complex compound including a metalloid.

Particularly, compounds having a single boron element at the anionic part are being widely used.

In this respect, a salt including an anion including a coordinate bonding complex compound including a single boron atom is preferable.

In the transition metal catalyst composition, the mole ratio of the transition metal compound of Chemical Formula 1 to the compound of Chemical Formula 11 may be 1:1 to 1:10, and preferably 1:10 to 1:4.

When the mole ratio is less than 1:1, the amount of the co-catalyst is relatively small and the metal compound cannot be completely activated, so the activity of the transition metal catalyst may be insufficient. When the mole ratio is larger than 1:10, the activity of the transition metal catalyst may increase but the production costs may significantly increase because more co-catalyst is used than necessary.

Specific examples of the compound of Chemical Formula 11 may be triethylammonium tetra(phenyl)boron, tributylammonium tetra(phenyl)boron, trimethylammonium tetra(phenyl)boron, tripropylammonium tetra(phenyl)boron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylamilidium tetra(phenyl)boron, N,N-diethylanilidium tetra(phenyl)boron, N,N-diethylanilinium tetra(pentafluorophenyl)boron, diethylammonium tetra(pentafluorophenyl)boron, triphenylphosphonium tetra(phenyl)boron, trimethylphosphonium tetra(phenyl)boron, triethylammonium tetra(phenyl)aluminum, tributylammonium tetra(phenyl)aluminum, trimethylammonium tetra(phenyl)aluminum, tripropylammonium tetra(phenyl)aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetra(pentafluorophenyl)aluminum, N,N-diethylanilinium tetra(phenyl)aluminum, N,N-diethylanilinium tetra(phenyl)aluminum, N,N-diethylanilinium tetra(pentafluorophenyl)aluminum, diethylammonium tetra(pentafluorophenyl)aluminum, triphenylphosphonium tetra(phenyl)aluminum, trimethylphosphonium tetra(phenyl)aluminum, triethylammonium tetra(phenyl)aluminum, tributylammonium tetra(phenyl)aluminum, trimethylammonium tetra(phenyl)boron, tripropylammonium tetra(phenyl)boron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylanilinium tetra(phenyl)boron, N,N-diethylanilinium tetra(phenyl)boron, N,N-diethylanilinium tetra(pentafluorophenyl)boron, diethylammonium tetra(pentafluorophenyl)boron, triphenylphosphonium tetra(phenyl)boron, triphenylcarbonium tetra(p-trifluoromethylphenyl)boron, triphenylcarbonium tetra(pentafluorophenyl)boron, trityltetra(pentafluorophenyl)boron, and so on, but are not limited to or by them.

Meanwhile, the compound of Chemical Formula 12 or 13 can work as a scavenger for eliminating impurities in the reactant which poison the catalyst.

In the transition metal catalyst composition, the mole ratio of the transition metal compound of Chemical Formula 1 to the compound of Chemical Formula 12 or 13 may be 1:1 to 1:5000, preferably 1:10 to 1:1000, and more preferably 1:20 to 1:500.

When the mole ratio is less than 1:1, the effect of adding the scavenger is poor, and when the ratio is larger than 1:5000, an overdose of an alkyl group and the like which fail to participate in the reaction may disturb the catalyst reaction and may inversely work as a catalytic poison. Accordingly, it may cause a problem of a side-reaction and an overdose of aluminum or boron remaining in the polymer.

Specific examples of the compound of Chemical Formula 12 may be trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum-methoxide, dimethylaluminumethoxide, trimethylboron, triethylboron, triisobutylboron, tripropylboron, and tributylboron, and preferably trimethylaluminum, triethylaluminum, or triisobutylaluminum may be used.

Specific examples of the compound of Chemical Formula 12 may be methylaluminoxane, ethylaluminoxane, isobutylaluminoxane, butylaluminoxane, and the like, and preferably methylaluminoxane.

The catalyst composition may include an aliphatic hydrocarbon solvent such as pentane, hexane, heptane, nonane, decane, and an isomer thereof; an aromatic hydrocarbon solvent such as toluene, xylene, and benzene; or a hydrocarbon solvent substituted by a chlorine atom such as dichloromethane, and chlorobenzene; but it is not limited to or by them and any known solvent which can be used for a transition metal catalyst can be used without restriction.

The content of the organic solvent in the transition metal catalyst composition may be properly regulated according to the characteristics of the catalyst composition used and the conditions of the preparation process of a polyolefin to which the composition is applied.

The transition metal compound and the co-catalyst may be used in a form in which it is fixed to a supporter such as silica or alumina. Any known supporter which is generally used for a catalyst for preparing a polyolefin may be used without restriction, and for example, silica, alumina, magnesia, or a mixture thereof may be used.

Furthermore, the supporter may be one that is dried at a high temperature, and may include an oxide, a carbonate, a sulfate, and a nitrate, such as $Na_2O$, $K_2CO_3$, $BaSO_4$, $Mg(NO_3)_2$, and so on, in general.

The transition metal catalyst composition may be prepared by reacting the transition metal compound of Chemical Formula 1 and one or more co-catalysts selected from the group consisting of the compounds of Chemical Formulae 11 to 13.

For example, the transition metal catalyst composition may be prepared by initially reacting the transition metal compound of Chemical Formula 1 and the co-catalyst compound of Chemical Formula 12 or 13, and then reacting the product and the co-catalyst compound of Chemical Formula 11.

According to another embodiment of the present invention, a method of preparing a polyolefin including the step of polymerizing an olefin monomer in the presence of the transition metal catalyst composition is provided.

As disclosed above, the transition metal compound of Chemical Formula 1 can increase the yield of a polymerization reaction, and characteristics such as chemical structure, molecular weight distribution, mechanical properties, and the like of a synthesized polyolefin can be easily controlled because the electrical and stereoscopic circumstances around the transition meal can be easily controlled.

Furthermore, the transition metal compound of Chemical Formula 1 can have higher activity at a high temperature than prior metallocene catalysts or post-metallocene catalysts (catalysts not including a cyclopentadienenyl ligand) because its interatomic bonding and intermolecular bonding are relatively strong, and thus it can progress the polymerization reaction of a polyolefin at a higher temperature with high efficiency in comparison to prior catalysts.

The polymerization reaction may be carried out at the temperature of 90° C. or more, and preferably 120° C. to 160° C.

When the polymerization reaction temperature is too low, it may be difficult to synthesize a polyolefin because the reactivity of the olefin monomer is not high, and when the polymerization reaction temperature is too high, the olefin monomer may be thermal degraded.

The polymerization reaction of the olefin monomer may be carried out by a continuous solution polymerization process, a bulk polymerization process, a suspension polymerization process, or an emulsion polymerization process, and preferably it may be carried out by a solution polymerization process in a single reactor.

The reactor used in the preparation method is not limited particularly, but it is preferable to use a continuous stirred tank reactor (CSTR) or a plug flow reactor (PFR).

It is preferable in the preparation method for 2 or more reactors to be arranged in series or parallel, and it is preferable that a separator for separating a solvent and unreacted monomers from the reacted mixture is additionally included.

When the preparation method of a polyolefin is carried out by a continuous solution polymerization process, it may be composed of the steps of a catalytic process, a polymerization process, a solvent separation process, and a collecting process, and the details are as follows.

a) Catalytic Process

The transition metal catalyst composition may be dissolved or diluted in an aliphatic or aromatic solvent and be injected.

For example, the transition metal catalyst composition may be dissolved or diluted in an aliphatic hydrocarbon solvent such as pentane, hexane, heptane, nonane, decane, and an isomer thereof; an aromatic hydrocarbon solvent such as toluene, xylene, and benzene; or a hydrocarbon solvent substituted by a chlorine atom such as dichloromethane and chlorobenzene.

It is possible to treat the solvent with a small dose of alkylaluminum in order to eliminate a tiny amount of water or air which works as a catalytic poison. It is also possible to use an excessive amount of the co-catalyst.

b) Polymerization Process

The polymerization process can be carried out by reacting the transition metal composition and the olefin monomer in the reactor.

In the polymerization process, when each reactant participates in the polymerization reaction in a solution form or slurry form, the solvent may be injected into the reactor.

The mole ratio of the olefin monomer and the solvent may be a proper ratio to dissolve the raw material before the reaction and the polymer formed after the reaction.

Specifically, the mole ratio of the olefin monomer to the solvent may be 10:1 to 1:10,000, preferably 5:1 to 1:100, and more preferably 1:1 to 1:20.

When the mole ratio of the solvent is less than 10:1, the solvent is too small in quantity and the viscosity of the fluid increases, and there may be a problem of transferring the formed polymer. Furthermore, when the mole ratio of the solvent is larger than 1:10,000, there is much more solvent than necessary, and it may require additional facilities for purifying and recycling the solvent and increase energy cost.

It is preferable that the solvent is put into the reactor at a temperature of –40° C. to 150° C. by using a heater or a refrigerator.

When the temperature of the solvent is lower than –40° C., there may be a difference in the amount of the reaction, and there is a difficulty in controlling the temperature because if the temperature of the solvent is too low the reaction temperature drops as well. Furthermore, when the temperature is higher than 150° C., there is a difficulty in controlling heat of the reaction because the temperature of the solvent is too high.

Meanwhile, the reactants (for example, the solvent, the olefin, the monomer, the catalyst composition, and so on) are applied by elevating the pressure up to 50 bar or more by using a high capacity pump, and thus it is possible to pass the reactant mixture through the arranged reactors, the pressure drop device, and the separator without an additional pumping process.

In the preparation method of a polyolefin, the internal temperature of the reactor, namely the temperature of the polymerization reaction, may be –15° C. to 300° C., preferably 90° C. or more, and more preferably 100° C. to 200° C.

When the internal temperature is lower than –15° C., there is a problem in that the reaction speed is low and the productivity decreases, and when the temperature is higher than 300° C., there may be problems of impurities being formed by a side-reaction and carbonization and discoloration of the polymer.

Further, in the preparation method of a polyolefin, the internal pressure of the reactor may be about 1 bar to 300 bar, preferably about 30 bar to 200 bar, and more preferably about 50 bar to 100 bar.

When the internal pressure is lower than 1 bar, there may be a problem that the reaction speed is low and the solvent is vaporized, and when the pressure is higher than 300 bar, there may be a problem that the cost of equipment, namely the cost of equipment for developing a high pressure, increases.

It is preferable to transfer the polymer formed in the reactor to the first solvent separation process in order to maintain a concentration of 20 wt % or less of the solvent and to eliminate the solvent after a short residence time.

The residence time of the formed polymer in the reactor is 1 min to 10 hr, preferably 3 min to 1 hr, and more preferably 5 min to 30 min.

When the residence time is less than 3 min, there are problems of productivity decrease due to the short residence time, loss of catalyst, and a resultant increase in preparation cost, and when the residence time excess 1 hr, there is a problem in that a larger reactor is required due to a longer reaction activation period of the catalyst and a resultant increase in equipment cost.

c) Solvent Separation Process

The solvent separation process is carried out by changing the temperature and pressure of the solution in order to eliminate the solvent co-existing with the polymer coming out of the reactor.

For example, the polymer solution transferred from the reactor is heated by a heater to about 200° C. to 230° C. and decompressed through the pressure drop device, and the unreacted raw materials and the solvent are vaporized at the first separator.

At this time, the pressure in the separator may be 1 bar to 30 bar, preferably 1 bar to 10 bar, and more preferably 3 bar to 8 bar, and the temperature in the separator may be 150° C. to 250° C., preferably 170° C. to 230° C., and more preferably 180° C. to 230° C.

When the pressure in the separator is lower than 1 bar, the content of the polymer increases and there is a problem in transferring, and when the pressure is higher than 30 bar, it may be difficult to separate the solvent used in the polymerization process.

Further, when the temperature in the separator is lower than 150° C., the viscosity of the copolymer and the mixture thereof increases and there is a problem of transferring, and when the temperature is higher than 250° C., it may cause a discoloration due to carbonation of the polymer according to degeneration by a high temperature.

The solvent vaporized at the separator can be condensed to be recycled to the reactor in an overhead system.

Through the first solvent separation process, it is possible to obtain a polymer solution enriched by up to 65%, and the polymer solution is transferred to the second separator through a heater by a transfer pump and the separation process of separating the residence solvent is carried out in the second separator.

While the solution passes through the heater, a thermal stabilizer is added thereto in order to prevent the modification of the polymer due to high temperature, and a reaction inhibitor is added in company with the thermal stabilizer in order to restrain the reaction of the polymer due to the residual activity of an activated complex existing in the polymer solution.

The residence solvent in the polymer solution introduced into the second separator is completely eliminated by a vacuum pump, and the polymer can be obtained by passing the product through cooling water and a cutting machine.

The solvent and other unreacted monomers vaporized in the second separation process are sent to the collecting process, and can be reused after purification.

d) Collecting Process

The organic solvent put in the polymerization process along with the raw materials may be recycled and reused in the polymerization process in company with the unreacted raw materials after the first solvent separation process.

However, the solvent collected in the second solvent separation process is contaminated by the reaction inhibitor for restraining the activity of the catalyst and the moisture included by steam supplied from the vacuum pump and working as a catalytic poison in the solvent, and thus it is preferable to reuse the same after purification in the collecting process.

In the preparation method of a polyolefin, any known devices, instruments, synthesis methods, reaction conditions, and so on which can be used for synthesizing a polyolefin by using a metallocene catalyst may be unlimitedly used, except the above-mentioned details.

Specific examples of the olefin monomer used in the preparation method of a polyolefin may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, and mixtures thereof.

Advantageous Effect of the Invention

According to the present invention, a transition metal catalyst composition which can exhibit high reactivity in a polymerization reaction of a polyolefin and can easily control characteristics such as chemical structure, molecular weight distribution, mechanical properties, and the like of a synthesized polyolefin, and a method of preparing a polyolefin using the catalyst composition, can be provided.

DETAILS FOR PRACTICING THE INVENTION

The present invention is explained in more detail in the following examples.

However, the following examples are only for illustrating the present invention and the details of the present invention are not limited to or by them.

SYNTHESIS EXAMPLES

Synthesis of Transition Metal Compound

Organic reagents and a solvent purchased from Aldrich Co. and Merk Co. were used after purifying the same with a standard method.

Contact with air and moisture was blocked in all steps of the syntheses in order to increase the reproducibility of the experiments.

A spectrum was obtained by using a 400 MHz nuclear magnetic resonance (NMR) device in order to confirm the structure of the compound.

In the following examples, the term "overnight" means about 12 to 16 hrs, and the term "room temperature" means a temperature of 20° C. to 25° C.

Every synthesis of the metal compound and the preparations of the experiments were carried out by using a drying closet technology or by using a glass instrument maintaining a dry condition.

Synthesis Example 1

Synthesis of 1,2,3,4-tetrahydro-8-((1,2,3,4-tetrahydroquinolin-8-yl)(phenyl)phosphino)quinoline (14)

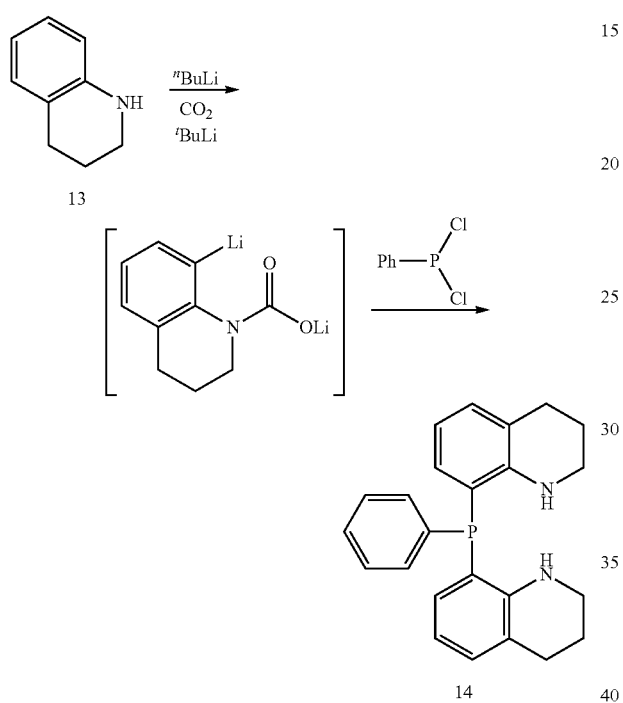

After dissolving 1,2,3,4-tetrahydroquinoline (13) (1.0 g, 7.51 mmol) in ether (20 mL) at room temperature, n-BuLi (0.53 g, 8.26 mmol) was added thereto at −40° C.

After stirring the same at room temperature for 5 hrs, $CO_2$ was injected therein at −20° C.

$CO_2$ was discharged while slowly elevating the temperature to room temperature, and THF (0.81 g, 11.26 mmol) was injected therein at room temperature.

After injecting t-BuLi (0.63 g, 9.76 mmol) therein at −40° C. and stirring the same at −20° C. for 5 hrs, p,p-Dichlorophenylphosphine (0.67 g, 3.75 mmol) was slowly injected therein at −20° C.

After stirring the same overnight at room temperature, the solvent was eliminated therefrom and $NH_4Cl$ was added thereto.

After extracting the organic layer by using dichloromethane and water and eliminating the moisture therefrom with $MgSO_4$, the solid was filtered.

After enriching the filtrate, a light yellow solid product (369 mg, 26.4%) was obtained by separating the filtrate with column chromatography.

$^1$H NMR (500 MHz, CDCl3): 7.45-7.41 (m, 2H), 7.09-6.93 (m, 5H), 6.84 (d, J=7.5 Hz, 2H), 6.53 (t, 2H), 4.71 (d, J=6.5 Hz, 2H), 2.82-2.79 (m, 4H), 2.51-2.48 (m, 4H), 1.54-1.49 (m, 4H).

Synthesis Example 2

Synthesis of 1,2,3,4-tetrahydro-8-((1,2,3,4-tetrahydroquinolin-8-yl)(phenyl)phosphino)quinoline zirconium benzyl (15)

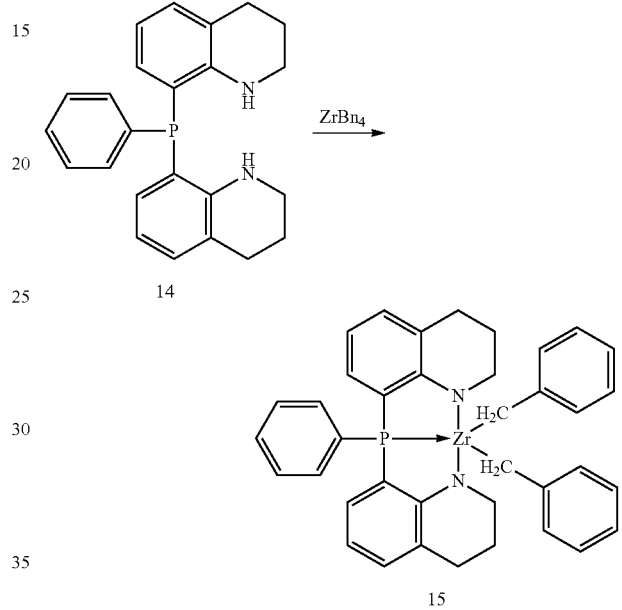

The compound (14) (50 mg, 0.134 mmol) prepared in Example 1 and tetrabenzyl zirconium ($ZnBn_4$, 61 mg, 0.134 mmol) were injected into toluene (5 mL) at −30° C.

After completely dissolving the solid injected into toluene, the structure was confirmed with NMR.

$^1$H NMR (500 MHz, $CDCl_3$): 7.28-6.81 (m, 12H), 6.61-6.54 (m, 4H), 6.38-6.25 (m, 4H), 5.66 (t, 1H), 4.29-4.25 (m, 2H), 3.14-3.09 (m, 2H), 2.78 (s, 1H), 2.66-2.61 (m, 2H), 2.51-2.48 (m, 2H), 2.24 (s, 1H), 1.80-1.76 (m, 2H), 1.70-1.67 (m, 2H).

EXAMPLES AND COMPARATIVE EXAMPLES

Preparation of Transition Metal Catalyst Composition and Synthesis of Polyolefin Example 1

After adding toluene (1.0 L) solvent and 0.8 M 1-octene (144 mL) diluted in toluene to a 2 L autoclave reactor, the reactor was preheated to a temperature of 120° C.

A 25 mL catalyst storage tank was filled with the zirconium compound (5.0 mmol, compound 15 of Synthesis Example 2) treated with the triisobutylaluminum compound (125 mmol), and trityl tetrakis(pentafluorophenyl)borate (25 mmol) co-catalyst in order.

After putting ethylene in the catalyst tank so that the pressure was 30 bar and progressing the copolymerization reaction for 10 min by injecting the catalyst into the reactor with high-pressure argon, the polymer solution obtained after discharging the remaining ethylene gas was added to excess ethanol so as to induce precipitation.

The obtained polymer was washed with each of ethanol and acetone 3 times, and dried in a vacuum oven at 80° C. for 12 hr.

The measured weight of the polymer and the results of characteristic evaluation are listed in Table 1.

Example 2

After adding hexane (1.0 L) solvent and 0.8 M 1-octene (144 mL) diluted in hexane to a 2 L autoclave reactor, the reactor was preheated to a temperature of 100° C.

A 25 mL catalyst storage tank was filled with the zirconium compound (5.0 mmol, compound 15 of Synthesis Example 2) treated with the triisobutylaluminum compound (125 mmol), and trityl tetrakis(pentafluorophenyl)borate (25 mmol) co-catalyst in order.

After putting ethylene in the catalyst tank so that the pressure was 30 bar and progressing the copolymerization reaction for 10 min by injecting the catalyst into the reactor with high-pressure argon, the polymer solution obtained after discharging the remaining ethylene gas was added to excess ethanol so as to induce precipitation.

The obtained polymer was washed with each of ethanol and acetone 3 times, and dried in a vacuum oven at 80° C. for 12 hr.

The measured weight of the polymer and the results of characteristic evaluation are listed in Table 1.

Comparative Example 1

After adding toluene (1.0 L) solvent and 0.8 M 1-octene (144 mL) diluted in toluene to a 2 L autoclave reactor, the reactor was preheated to a temperature of 120° C.

A 25 mL catalyst storage tank was filled with the zirconium compound (5.0 mmol, the compound of the following General Formula 16 (product of Dow Chemical)) treated with the triisobutylaluminum compound (125 mmol), and trityl tetrakis(pentafluorophenyl)borate (25 mmol) co-catalyst in order.

After putting ethylene in the catalyst tank so that the pressure was 30 bar and progressing the copolymerization reaction for 10 min by injecting the catalyst into the reactor with high-pressure argon, the polymer solution obtained after discharging the remaining ethylene gas was added to excess ethanol so as to induce precipitation.

The obtained polymer was washed with each of ethanol and acetone 3 times, and dried in a vacuum oven at 80° C. for 12 hr.

The measured weight of the polymer and the results of characteristic evaluation are listed in Table 1.

Comparative Example 2

After adding hexane (1.0 L) solvent and 0.8 M 1-octene (144 mL) diluted in hexane to a 2 L autoclave reactor, the reactor was preheated to a temperature of 120° C.

A 25 mL catalyst storage tank was filled with the zirconium compound (5.0 mmol, the compound of the following General Formula 16 (product of Dow Chemical)) treated with the triisobutylaluminum compound (125 mmol), and trityl tetrakis(pentafluorophenyl)borate (25 mmol) co-catalyst in order.

After putting ethylene in the catalyst tank so that the pressure was 30 bar and progressing the copolymerization reaction for 10 min by injecting the catalyst into the reactor with high-pressure argon, the polymer solution obtained after discharging the remaining ethylene gas was added to excess ethanol so as to induce precipitation.

The obtained polymer was washed with each of ethanol and acetone 3 times, and dried in a vacuum oven of 80° C. for 12 hr.

The measured weight of the polymer and the results of characteristic evaluation are listed in Table 1.

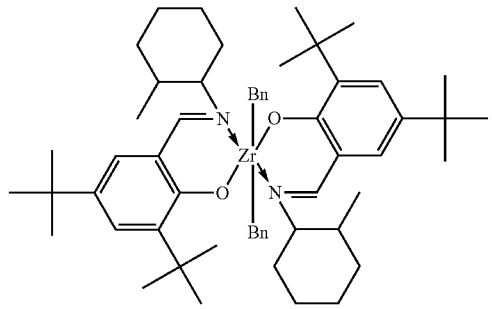

[General Formula 16]

EXPERIMENTAL EXAMPLES

Experimental Example 1

Measuring Reaction Yield and Density of Polyolefin (1) The yield of polyolefins synthesized in the examples and comparative examples was calculated from the weight of particles obtained during 10 min.

(2) The density of polyolefins synthesized in the examples and comparative examples was measured with Mettler balances, after preparing sheets with a thickness of 3 mm and a radius of 2 cm by using a press mold at 180° C. and cooling the same by 10° C./min.

Experimental Example 2

Measuring Molecular Weight and Molecular Weight Distribution

Number average molecular weight (Mn) and weight average molecular weight (Mw) of the polyolefins synthesized in the examples and comparative examples were measured by using a high temperature GPC(PL-GPC220) device, and the molecular weight distribution (MWD, Mw/Mn) was obtained therefrom.

The results of the experimental examples are listed in the following Table 1.

TABLE 1

Results of Experimental Examples

| | Solvent | Molecular weight (Mw) | Molecular weight distribution (Mw/Mn) | Density (g/cm$^3$) | Melting point | Reactivity (Kg PE/ mmol M hr) |
|---|---|---|---|---|---|---|
| Example 1 | Toluene | 136,480 | 2.3 | 0.935 | 137.7 | 38.46 |
| Example 2 | Hexane | 124,294 | 2.7 | 0.936 | 137.5 | 35.60 |

TABLE 1-continued

Results of Experimental Examples

| | Solvent | Molecular weight (Mw) | Molecular weight distribution (Mw/Mn) | Density (g/cm³) | Melting point | Reactivity (Kg·PE/mmol M hr) |
|---|---|---|---|---|---|---|
| Comparative Example 1 | Toluene | 101,609 | 2.9 | 0.935 | 136.4 | 17.96 |
| Comparative Example 2 | Hexane | 115,347 | 3.1 | 0.937 | 136.9 | 12.60 |

As shown in Table 1, it is recognized that the cases of Examples 1 and 2 using the transition metal catalysts of the synthesis examples can exhibit high reactivity of 35 Kg·PE/mmol·M·hr or more and can synthesize a polymer having relatively high molecular weight in comparison to the comparative examples.

That is, the catalysts used in Examples 1 and 2 can maintain their high activity even at a high temperature of about 120° C., and can progress the polymerization reaction of the polyolefin with high efficiency in a higher temperature range in comparison to prior known catalysts.

On the contrary, it is recognized that the cases of the comparative examples using prior known catalysts exhibit reactivity of less than 18 Kg·PE/mmol·M·hr and synthesize a polymer having a lower molecular weight in comparison to the examples.

What is claimed is:

1. A transition metal catalyst composition including a transition metal compound of the following Chemical Formula 1, a co-catalyst, and an organic solvent:

[Chemical Formula 1]

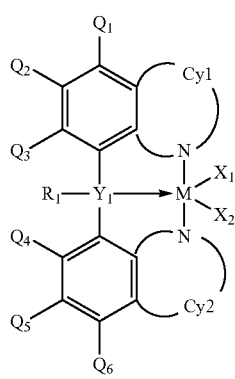

wherein, in Chemical Formula 1, $R_1$ is a $C_1$-$C_{10}$ alkyl unsubstituted or substituted with a halogen group, a $C_5$-$C_{60}$ cycloalkyl unsubstituted or substituted with a halogen group, a $C_6$-$C_{60}$ aryl unsubstituted or substituted with a halogen group, a $C_5$-$C_{60}$ cycloalkenyl unsubstituted or substituted with a halogen group, a $C_2$-$C_{20}$ alkenyl unsubstituted or substituted with a halogen group, a $C_7$-$C_{60}$ alkylaryl unsubstituted or substituted with a halogen group, or a $C_7$-$C_{60}$ arylalkyl unsubstituted or substituted with a halogen group;

$Q_1$, $Q_2$, $Q_3$, $Q_4$, $Q_5$, and $Q_6$ may be the same as or different from each other and are independently hydrogen, deuterium, a halogen group, a nitrile group, an acetylene group, an amine group, an amide group, a $C_1$-$C_{20}$ alkoxy carbonyl group, a $C_1$-$C_{20}$ alkanoyl group, a silyl group, a $C_1$-$C_{20}$ alkyl group, a $C_2$-$C_{20}$ alkenyl group, a $C_6$-$C_{20}$ aryl group, a $C_4$-$C_{20}$ heteroring group, a $C_1$-$C_{20}$ alkoxy group, or a $C_6$-$C_{20}$ aryloxy group, and 2 or more of $Q_1$, $Q_2$, $Q_3$, $Q_4$, $Q_5$, and $Q_6$ may be connected to each other so as to form an aliphatic ring or an aromatic ring;

Cy1 and Cy2 may be the same as or different from each other and are independently a $C_4$-$C_{10}$ aliphatic ring which includes a nitrogen atom and is unsubstituted or substituted with one or more functional groups selected from the group consisting of hydrogen, a halogen, a $C_1$-$C_{20}$ alkyl group, a $C_2$-$C_{20}$ alkenyl group, a $C_7$-$C_{20}$ alkylaryl, a $C_7$-$C_{20}$ arylalkyl, a $C_1$-$C_{20}$ alkoxy group, a $C_6$-$C_{20}$ aryloxy group, and a $C_6$-$C_{20}$ aryl group, and if there are two or more functional groups substituted in the aliphatic ring, they may be connected to each other so as to form an aliphatic ring or an aromatic ring;

M is a group 3 to 12 transition metal;

$Y_1$ is nitrogen or phosphorus;

M and $Y_1$ form a coordinate bond; and $X_1$ and $X_2$ may be the same as or different from each other and are independently a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, a $C_7$-$C_{20}$ arylalkyl group, a $C_1$-$C_{20}$ alkylamido group, a $C_6$-$C_{20}$ arylamido group, or a $C_1$-$C_{20}$ alkylidene group.

2. The transition metal catalyst composition according to claim 1, wherein the transition metal compound includes a transition metal compound of the following Chemical Formula 2:

[Chemical Formula 2]

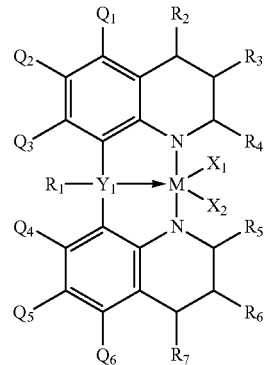

wherein, in Chemical Formula 2, $R_1$ is a $C_1$-$C_{10}$ alkyl unsubstituted or substituted with a halogen group, a $C_5$-$C_{60}$ cycloalkyl unsubstituted or substituted with a halogen group, a $C_6$-$C_{60}$ aryl unsubstituted or substituted with a halogen group, a $C_5$-$C_{60}$ cycloalkenyl unsubstituted or substituted with a halogen group, a $C_2$-$C_{20}$ alkenyl unsubstituted or substituted with a halogen group, a $C_7$-$C_{60}$ alkylaryl unsubstituted or substituted with a halogen group, or a $C_7$-$C_{60}$ arylalkyl unsubstituted or substituted with a halogen group;

$Q_1$, $Q_2$, $Q_3$, $Q_4$, $Q_5$, and $Q_6$ may be the same as or different from each other and are independently hydrogen, deuterium, a halogen group, a nitrile group, an acetylene group, an amine group, an amide group, a $C_1$-$C_{20}$ alkoxy carbonyl group, a $C_1$-$C_{20}$ alkanoyl group, a silyl group, a $C_1$-$C_{20}$ alkyl group, a $C_2$-$C_{20}$ alkenyl group, a $C_6$-$C_{20}$ aryl group, a $C_4$-$C_{20}$ heteroring group, a $C_1$-$C_{20}$ alkoxy group, or a $C_6$-$C_{20}$ aryloxy group, and 2 or more of $Q_1$, $Q_2$, $Q_3$, $Q_4$, $Q_5$, and $Q_6$ may be connected to each other so as to form an aliphatic ring or an aromatic ring;

$R_2$, $R_3$, $R_4$, $R_5$, $R_6$, and $R_7$ may be the same as or different from each other and are independently hydrogen, a $C_1$-$C_{10}$ alkyl group, a $C_2$-$C_{20}$ alkenyl group, a $C_6$-$C_{20}$ aryl group, a $C_7$-$C_{20}$ alkylaryl, a $C_7$-$C_{20}$ arylalkyl, a $C_1$-$C_{20}$ alkoxy group, or a $C_6$-$C_{20}$ aryloxy group;

M is a group 3 to 12 transition metal;

$Y_1$ is nitrogen or phosphorus;

M and $Y_1$ form a coordinate bond; and $X_1$ and $X_2$ may be the same as or different from each other and are independently a halogen, a $C_1$-$C_{20}$ alkyl group, a $C_2$-$C_{20}$ alkenyl group, a $C_6$-$C_{20}$ aryl group, a $C_7$-$C_{20}$ alkylaryl group, a $C_7$-$C_{20}$ arylalkyl group, a $C_1$-$C_{20}$ alkylamido group, a $C_6$-$C_{20}$ arylamido group, or a $C_1$-$C_{20}$ alkylidene group.

3. The transition metal catalyst composition according to claim 1, wherein the transition metal compound includes the transition metal compound of the following Chemical Formula 3:

[Chemical Formula 3]

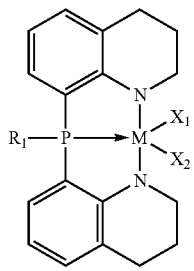

wherein, in Chemical Formula 3, $R_1$ is phenyl group, a cyclohexyl group, a methyl, an ethyl, an n-propyl, an iso-propyl, an n-butyl, an iso-butyl, or a tert-butyl; and $X_1$ and $X_2$ may be the same as or different from each other and are independently a halogen, a phenyl, a $C_7$-$C_{10}$ alkylaryl, a cyclohexyl group, a methyl, ethyl, an n-propyl, an iso-propyl, an n-butyl, an iso-butyl, or a tert-butyl.

4. The transition metal catalyst composition according to claim 1, wherein the co-catalyst includes one or more compounds selected from the group consisting of compounds of the following Chemical Formulae 11 to 13:

$[L-H]^+[Z(E)_4]^-$ or $[L]^+[Z(E)_4]^-$      [Chemical Formula 11]

wherein, in Chemical Formula 11,

L is a neutral or cationic Lewis base;

$[L-H]^+$ or $[L]^+$ is a Bronsted acid;

H is a hydrogen atom;

Z is a group 13 element; and each E may be the same as or different from each other and are independently an unsubstituted $C_6$-$C_{20}$ aryl group or $C_1$-$C_{20}$ alkyl group or a $C_6$-$C_{20}$ aryl group or $C_1$-$C_{20}$ alkyl group of which one or more hydrogen atoms are substituted by a halogen, a $C_1$-$C_{20}$ hydrocarbyl, an alkoxy group, or a phenyl group, $D(R_9)_3$      [Chemical Formula 12]

wherein, in Chemical Formula 12,

D is aluminum or boron; and each $R_9$ may be the same as or different from each other and are independently a halogen, a $C_1$-$C_{20}$ hydrocarbyl group, or a $C_1$-$C_{20}$ hydrocarbyl group substituted with a halogen,

[Chemical Formula 13]

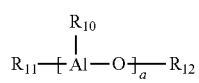

wherein, in Chemical Formula 13, $R_{10}$, $R_{11}$, and $R_{12}$ may be the same as or different from each other and are independently hydrogen, a halogen, a $C_1$-$C_{20}$ aliphatic hydrocarbyl, or a $C_1$-$C_{20}$ aliphatic hydrocarbyl substituted with a halogen, and a is an integer of 2 or more.

5. The transition metal catalyst composition according to claim 4, wherein a mole ratio of the transition metal compound of Chemical Formula 1 to the compound of Chemical Formula 11 is 1:1 to 1:10.

6. The transition metal catalyst composition according to claim 4, wherein a mole ratio of the transition metal compound of Chemical Formula 1 to the compound of Chemical Formula 12 or 13 is 1:1 to 1:5000.

7. The transition metal catalyst composition according to claim 1, including 50 to 800 parts by weight of the organic solvent per 100 parts by weight of the transition metal compound.

8. A method of preparing a polyolefin, including polymerizing an olefin monomer in the presence of the transition metal catalyst composition according to claim 1.

9. The method according to claim 8, wherein the olefin monomer includes one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

10. The method according to claim 8, wherein the polymerization reaction of the olefin monomer is carried out at a temperature of 90° C. or more.

* * * * *